2,899,465
Patented Aug. 11, 1959

2,899,465

TRICHLOROBENZENE COMPOUNDS AND
THEIR PRODUCTION

Theodore A. Girard, Wayne Township, Passaic County, and David X. Klein, Upper Montclair, N.J., assignors to Heyden Newport Chemical Corporation, a corporation of Delaware No Drawing. Application March 21, 1955
Serial No. 495,781

6 Claims. (Cl. 260—523)

The present invention relates to the production of trichlorobenzoic acid and is primarily concerned with the production of 2,3,6-trichlorobenzoic by the oxidation with nitric acid of one of the novel compounds, 2,3,6-trichlorobenzylamine, 2,3,6-trichlorobenzyl sodium thiosulfate, 2,3,6-trichlorobenzyl thiosulfuric acid or di(2,3,6-trichlorobenzyl) sulfide.

Benzylchloride having either no nuclear chlorination or nuclear monochlorination can be oxidized with potassium permanganate to the corresponding benzoic acid. Dilute nitric acid can be used to oxidize benzylchloride to benzoic acid but concentrated nitric acid tends to effect nuclear nitration. Trichlorobenzyl compounds enter into reactions involving the benzyl side chain with relatively great difficulty and this is especially true of the 2,3,6-trichlorobenzyl compounds, for example, 2,3,6-trichlorobenzyl chloride. Thus, while 2,3,6-trichlorobenzyl chloride can be readily formed from 2,3,6-trichlorotoluene, such a route for preparing 2,3,6-trichlorobenzoic acid presents serious difficulties.

We have discovered that 2,3,6-trichlorobenzyl chloride can be converted to 2,3,6-trichlorobenzylamine, 2,3,6-trichlorobenzyl sodium thiosulfate or di(2,3,6-trichlorobenzyl) sulfide in good yield and then either one of these last mentioned compounds can be reacted with concentrated nitric acid to form 2,3,6-trichlorobenzoic acid without effecting substantial ring nitration.

The 2,3,6-trichlorobenzyl sodium thiosulfate can be formed by reacting 2,3,6-trichlorobenzyl chloride with sodium thiosulfate. It is believed that this reaction proceeds as follows:

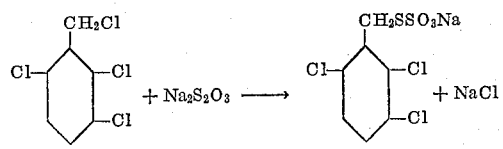

This sodium salt can be readily converted to the acid form, trichlorobenzyl thiosulfuric acid, by a strong mineral acid such as $H_2SO_4$, HCl or $HNO_3$ in accordance with the following reaction using nitric acid:

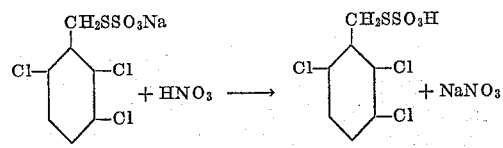

The trichlorobenzyl thiosulfuric acid produced in accordance with the above reaction or produced in any other manner is oxidized by nitric acid and it is believed that this reaction proceeds as follows:

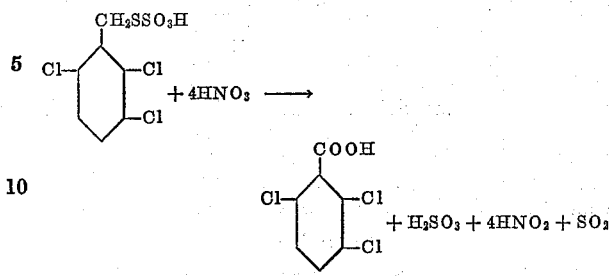

In accordance with the last mentioned reaction each mole of the thiosulfuric acid compound requires 4 moles of nitric acid. However, if the trichlorobenzyl thiosulfuric acid is formed in situ from the trichlorobenzyl sodium thiosulfate, then the stoichiometric amount of nitric acid is 5 moles per mole of starting material. The foregoing description refers to sodium thiosulfate and it is to be understood that other alkali metal thiosulfates may be used in the same manner.

The sulfide can be readily prepared by reacting 2,3,6-trichlorobenzyl chloride with alkali metal sulfide. This reaction may be represented by the following equation:

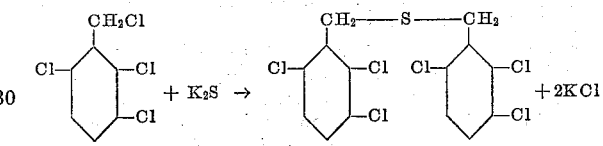

This sulfide can be oxidized upon heating with nitric acid to form the corresponding benzoic acid and it is believed that this reaction proceeds as follows:

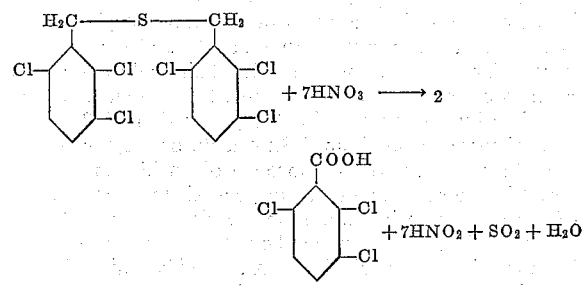

Thus, each mole of trichlorobenzyl sulfide requires 7 moles of nitric acid.

The 2,3,6-trichlorobenzyl amine can be formed by reacting trichlorobenzyl chloride with ammonia in the presence of a solvent and this reaction may be represented by the following equation:

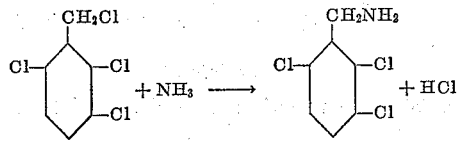

The trichlorobenzyl amine can be oxidized with nitric acid and this reaction may be represented by the following equation:

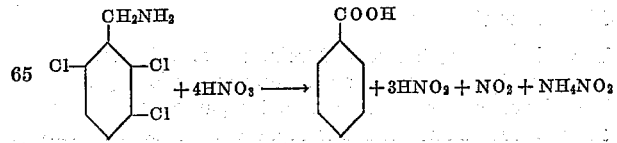

As shown, each mole of trichlorobenzyl amine requires 4 moles of nitric acid.

In the foregoing oxidation reactions, one mole of 2,3,6-trichlorobenzyl thiosulfuric acid or 2,3,6-trichlorobenzyl amine requires 4 moles of nitric acid while one mole of di(2,3,6-trichlorobenzyl) sulfide requires 7 moles of nitric acid. These molal ratios are the stoichiometric amounts. Preferably an excess of nitric acid is used to increase the yield. Large excesses of nitric acid may be used. As used herein when the term "nitric acid" is accompanied by a percentage figure, the figure refers to the percentage of nitric acid present in the material used with the remainder being water plus the small amount of impurities present in commercial nitric acid. Thus, "70% nitric acid" refers to the fact that the nitric acid used contained about 70% nitric acid and 30% water. Nitric acid of other concentrations may be used with the preferred concentration being in the range of 60–85%.

*Example I*

Chlorine gas may be passed over the surface of a body of mixed isomers of trichlorotoluene at about 205–210° C. until the weight increase corresponds to the theoretical as determined in accordance with the following reaction:

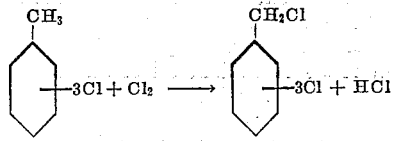

The mixture is then blown with air at 100° C. to remove any free chlorine and hydrogen chloride present. In this manner trichlorobenzyl chloride may be obtained in 100% yield based on the trichlorotoluene charged. The isomer or isomers present in the product is the same as the isomer or isomers of the starting material. In this particular case a mixture of trichlorotoluene isomers was used in which a major portion consisted of 2,3,6-trichlorotoluene and a minor portion consisted of a mixture of the 2,3,4-isomer, 2,3,5-isomer, 2,4,5-isomer and 2,4,6-isomer. Accordingly, the trichlorobenzyl chloride was a mixture of the corresponding isomers in the same proportions.

All of the various isomers of trichlorobenzyl chloride can be prepared in any suitable manner and may be prepared, for example, by the side chain chlorination of isomers of trichlorotoluene. While the present invention is primarily concerned with the production of 2,3,6-trichlorobenzoic acid from 2,3,6-trichlorobenzyl chloride, the other isomers of trichlorobenzoic acid can be prepared in the same manner. In general, the arrangement of the three chlorine atoms on the ring in the trichlorobenzoic acid are the same as the arrangement in the starting material. The trichlorobenzoic acids which do not contain the 2,6-arrangement are, if anything, more readily produced as these other isomers are more reactive. The spatial arrangement of the 2,3,6 isomer renders it less reactive. Such a mixture of isomers was used in the following examples so that the trichlorobenzoic acid produced was a mixture of isomers with 2,3,6-trichlorobenzoic acid predominating. Pure or substantially pure 2,3,6-trichlorobenzyl chloride may be used in the same manner.

*Example II*

The following materials were charged into a reactor equipped with a reflux condenser:

173 g. (0.75 mole) trichlorobenzyl chloride, mixed isomers
230 g. (1.5 mole) sodium thiosulfate
600 g. water
500 g. ethanol The mixture was heated and refluxed for 8 hours, then cooled and the liquor decanted from the residue present. The liquor was concentrated under partial vacuum to 500 ml., cooled and filtered to separate the product. This product apparently was trichlorobenzyl sodium thiosulfate and after drying it weighed 120 g., a yield of 50% based on the trichlorobenzyl chloride charged.

The 120 g. (0.38 mole) of product obtained above was charged into a reactor along with 430 g. (4.8 mole) of 70% nitric acid over a period of 45 min. On the assumption that 0.38 mole of the nitric acid reacted with the trichlorobenzyl sodium thiosulfate, then the molal ratio of trichlorobenzyl thiosulfuric acid to nitric acid was 0.38:4.42 or about 1:12. The charge was heated to reflux and held at this temperature for 8 hours. The reaction mixture was cooled and filtered to separate the crude trichlorobenzoic acid. This crude product was purified by dissolving it in dilute aqueous sodium hydroxide and then reprecipitating the trichlorobenzoic acid by acidifying the solution with hydrochloric acid. In this manner there was obtained 24 g. (26% yield based on the trichlorobenzyl sodium thiosulfate) of trichlorobenzoic acid containing a high percentage of the 2,3,6-isomer.

*Example III*

The following materials were charged into a reactor equipped with a reflux condenser:

173 g. (0.75 mole) trichlorobenzyl chloride (mixed isomers)
66 g. (0.6 mole) potassium sulfide
450 ml. ethanol The mixture was refluxed for 72 hours, drowned in cold water and the sulfide oil was separated and washed with water. Then 167 g. (0.42 mole) of this di(trichlorobenzyl) sulfide was placed in a reactor with 810 g. (9 moles) of 70% nitric acid. The mixture was heated and refluxed for 6 hours and then drowned in cold water. The crude was separated by filtration and purified by dissolving in aqueous sodium hydroxide followed by reprecipitating with hydrochloric acid. The separated trichlorobenzoic acid which was a mixture of isomers containing a high percentage of the 2,3,6-isomer weighed 33 g., 19% yield based on the di(trichlorobenzyl) sulfide.

*Example IV*

Two hundred thirty-one grams of mixed isomers of trichlorobenzyl chloride, like that of Example I, were charged into a reactor and then there was slowly added a solution of 255 g. (15 moles) of ammonia gas dissolved in 2 liters of methanol while cooling to maintain the temperature below 20° C. The mixture was then stirred at room temperature for 72 hours. The excess methanol and ammonia were removed under partial vacuum. The residue was treated with 200 g. of 40% sodium hydroxide solution and then extracted with two one liter portions of ether. The combined extracts were dried over anhydrous sodium sulfate and then evaporated to dryness. The product, crude trichlorobenzyl amine, weighed 205 g., a yield of 97.4% based on the trichlorobenzyl chloride charged.

The 205 g. (.97 mole) of product obtained above was cooled to 10° C. and mixed with 1080 (12 moles) of 70% nitric acid. The mixture was stirred at room temperature for 30 min. and then heated at reflux for 8 hours. The reaction was then cooled to room temperature and the spent acid was decanted from the residual crude trichlorobenzoid acid Two 1250 ml. portions of water were used to wash the residue which was then dissolved in 2000 g. of 10% sodium hydroxide. This solution was treated with 500 ml. of chloroform to remove the alkali insoluble impuritities. The solution was then treated with 10 g. of activated charcoal to effect decolorization, filtered, and acidified with 500 ml. of concentrated hydrochloric acid to recrystallize the trichlorobenzoic acid. The precipitate was separated by filtration, washed with water and air dried at 50° C. The product weighed 97.5 g., 43.3% yield based on the trichlorobenzyl amine.

In each of Examples II, III and IV, the trichlorobenzyl-chloride was a mixture of isomers containing a high percentage of the 2,3,6-isomer such as described in Example I. Accordingly, the trichlorobenzoic acid product was a mixture of isomers containing a high percentage of 2,3,6-trichlorobenzoic acid. Other isomer mixtures could be used as well as pure or substantially pure, 2,3,6-trichlorobenzyl chloride as a starting material.

We claim:

1. In the process of producing 2,3,6-trichlorobenzoic acid, heating at reflux temperature under atmospheric pressure a trichlorobenzyl compound selected from the group consisting of 2,3,6-trichlorobenzyl thiosulfuric acid, di-(2,3,6-trichlorobenzyl) sulfide and 2,3,6-trichlorobenzylamine with an amount of concentrated nitric acid in excess of the stoichiometric amount to form 2,3,6-trichlorobenzoic acid.

2. In the process of producing 2,3,6-trichlorobenzoic acid, the steps comprising refluxing 60–85% nitric acid under atmospheric pressure with 2,3,6-trichlorobenzyl thiosulfuric acid in a molal ratio greater than 4 to form 2,3,6-trichlorobenzoic acid, and then recovering the 2,3,6-trichlorobenzoic acid.

3. In the process of producing 2,3,6-trichlorobenzoic acid, the steps comprising refluxing 60–85% nitric acid under atmospheric pressure with 2,3,6-trichlorobenzylamine in a molal ratio greater than 4 to form 2,3,6-trichlorobenzoic acid, and then recovering the 2,3,6-trichlorobenzoic acid.

4. In the process of producing 2,3,6-trichlorobenzoic acid, the steps comprising refluxing 60–85% nitric acid under atmospheric pressure with di(2,3,6-trichlorobenzyl) sulfide in a molal ratio greater than 7 to form 2,3,6-trichlorobenzoic acid, and then recovering the 2,3,6-trichlorobenzoic acid.

5. In the process of producing 2,3,6-trichlorobenzoic acid, the steps comprising refluxing at atmospheric pressure a trichlorobenzyl compound selected from the group consisting of 2,3,6-trichlorobenzyl thiosulfuric acid, 2,3,6-trichlorobenzylamine and di(2,3,6-trichlorobenzyl) sulfide with an amount of 60–85% nitric acid in excess of the stoichiometric amount to form 2,3,6-trichlorobenzoic acid separating crude 2,3,6-trichlorobenzoic acid from the resulting reaction mixture, dissolving the separated crude 2,3,6-trichlorobenzoic acid in an aqueous solution of an alkaline, alkali metal compound, treating the solution with mineral acid to precipitate the 2,3,6-trichlorobenzoic acid, and separating the precipitated 2,3,6-trichlorobenzoic acid.

6. In the process of producing trichlorobenzoic acid, the steps comprising refluxing under atmospheric pressure a trichlorobenzyl compound selected from the group consisting of trichlorobenzyl thiosulfuric acid, di-(trichlorobenzyl) sulfide and trichlorobenzylamine with at least the stoichiometric amount of concentrated nitric acid to form trichlorobenzoic acid, said trichlorobenzyl compound and said trichlorobenzoic acid each having a chlorine atom in the 2-position and the 6-position on the ring.

References Cited in the file of this patent

UNITED STATES PATENTS

| 1,878,462 | Britton | Sept. 20, 1932 |
| 2,172,954 | Clark | Sept. 12, 1939 |
| 2,195,539 | Mikeska et al. | Apr. 2, 1940 |
| 2,606,208 | Burtner | Aug. 5, 1952 |
| 2,618,657 | Vaughn et al. | Nov. 18, 1952 |
| 2,635,114 | Schlatter | Apr. 14, 1953 |
| 2,666,786 | Kulka et al. | Jan. 19, 1954 |
| 2,712,547 | Lecher | July 5, 1955 |
| 2,740,811 | Lotz | Apr. 3, 1956 |

OTHER REFERENCES

Brimelow: J. Chem. Soc., pp. 1208–12 (1951).
Brimelow: Chem. Abs., vol. 46, col's. 2002–3 (1952).